(No Model.)

J. C. MILLER.
WICK CARRIER.

No. 483,850. Patented Oct. 4, 1892.

Witnesses
J. H. Shumway
Lillian D. Kelsey

John C. Miller
Inventor
By atty's
Earle Seymour

UNITED STATES PATENT OFFICE.

JOHN C. MILLER, OF WATERBURY, CONNECTICUT, ASSIGNOR TO THE MATTHEWS & WILLARD MANUFACTURING COMPANY, OF SAME PLACE.

WICK-CARRIER.

SPECIFICATION forming part of Letters Patent No. 483,850, dated October 4, 1892.

Application filed May 2, 1892. Serial No. 431,561. (No model.)

*To all whom it may concern:*

Be it known that I, JOHN C. MILLER, of Waterbury, in the county of New Haven and State of Connecticut, have invented a new Improvement in Wick-Carriers; and I do hereby declare the following, when taken in connection with accompanying drawings and the letters of reference marked thereon, to be a full, clear, and exact description of the same, and which said drawings constitute part of this specification, and represent, in—

Figure 1:
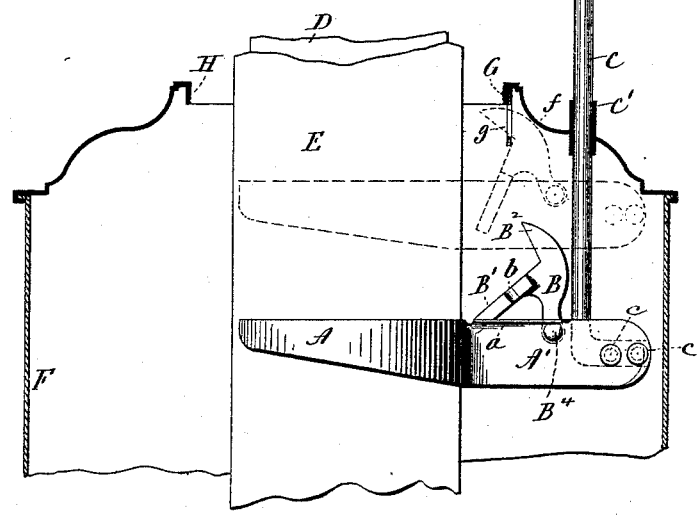
Figure 2:
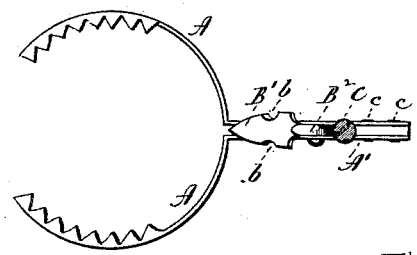
Figure 3:
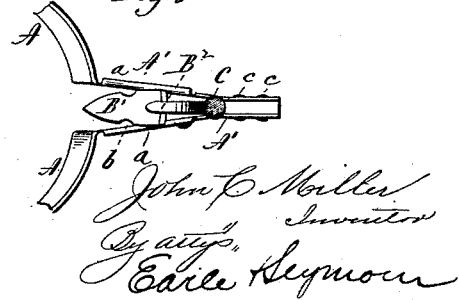

Figure 1, a view, partly in vertical section and partly in side elevation, of a lamp provided with a wick-carrier made in accordance with my invention; Fig. 2, a detached plan view of the carrier in its closed adjustment with its draw-bar broken away; Fig. 3, a similar but broken view of the device in its open adjustment.

My invention relates to an improvement in wick-carriers for central-draft lamps, the object being to provide a simple, cheap, convenient, and effective device.

With these ends in view my invention consists in a wick-carrier having certain details of construction and combinations of parts, as will be hereinafter described, and pointed out in the claims.

As herein shown, my improved wick-carrier is composed of two spring sheet-metal clamping-arms A A, having shanks A' A', a dog B, pivoted between the said shanks near the upper edges thereof, and a straight draw-bar C, the lower end of which is bent at a right angle and secured by rivets c c between the extreme outer ends of the said shanks, the said draw-bar being formed of a heavy rod or wire and having bearing at its upper end in a vertical sleeve C', mounted in the top of the fount. Each clamping-arm and its shank are made of a piece of spring sheet metal—such as steel—bent into shape, the arm proper being bowed to conform to the curvature of the draft-tube D and having a portion of its upper edge turned inward at a right angle and toothed to grip the wick E, encircling the said tube, which is supported from its lower end in the fount F. The fount and tube are of any approved construction. The shanks of the arms are straight and provided near their inner ends and at their upper edges with fins $a$, which are turned outward and constitute beveled surfaces converging toward each other and guiding the point of the wedge B' of the dog B between the said shanks, the said wedge being provided on the opposite sides with notches $b$, which the said upper edges of the shanks spring into, whereby the wedge is held between them instead of being ejected by their spring action, which tends to close them together, for it is apparent that if the sides of the wedge were smooth its ejection, as described, might occur. The said dog is also provided with a tripping-tooth $B^2$, extending above and located in a plane a little more than a right angle to the plane of the said wedge. This tooth has a straight inner edge and a curved outer edge and co-operates with a tripping device depending from the lamp-fount and with the top of the fount itself. As herein shown, the tripping device consists of a little plate G, rigidly secured by its upper end to the top of the fount, at a point close to the threaded collar H, mounted therein, and the said plate having an eye or opening $g$, adapted in its dimensions to receive the said tooth, as shown by broken lines in Fig. 1 of the drawings. The curved outer edge of the tooth engages just before the wick-carrier is raised to its highest position with the top of the lamp-fount at the point $f$ thereof, the lifting of the carrier after the tooth has so engaged with the fount operating to turn the dog on its pivot $B^4$, whereby its tooth is projected into the opening $g$ of the plate G, and its wedge is forced down between the inner ends of the shanks of the clamping-arms, which are thus separated and disengaged from the wick, which may then be removed. When the carrier is again depressed by pushing down on its draw-bar C, the tripping device with which the tooth of its dog is engaged retards the same and causes it to again turn outwardly on its pivot, whereby its wedge is withdrawn from between the shanks of the clamping-arms, which are thus permitted to fly together again and engage with the wick. It will thus be seen that by the engagement of the tooth of the dog with the upper portion of the fount when the carrier is being lifted by its draw-bar the wedge of the dog is forced between the shanks of the spring clamping-arms and that the retarding of the dog by its tooth and the tripping device when the carrier is again depressed operates to withdraw the wedge from the shanks of the clamping-arms and permit the same to engage with the wick.

I wish particularly to call attention to the fact that under my present invention the action of the carrier is in no way dependent upon the lamp-burner, and to remark that the wick-carrier can be as well operated and the wick removed with the burner in place in the fount as with it detached therefrom.

I would have it understood that I do not limit myself to the exact construction herein shown and described, but hold myself at liberty to make such changes and alterations as fairly fall within the spirit and scope of my invention.

Having fully described my invention, what I claim as new, and desire to secure by Letters Patent, is—

1. In a central-draft lamp, the combination, with the fount and draft-tube thereof, the top of the former being constructed with a cam-surface, of a wick-carrier comprising two clamping-arms, a draw-bar attached to the shanks thereof and extending upward through the top of the fount, in which it has bearing, a dog pivoted between the shanks of the jaws and having a wedge and a tripping-tooth, which latter engages with the said cam-surface to turn the dog in one direction, and a tripping device depending from the top of the fount and constructed to permit the dog to be thrown inward for entering its wedge between the said arms when the carrier is raised to the top of the fount and operating through the tripping-tooth to withdraw the wedge from between the arms when the draw-bar is forced downward, substantially as described.

2. In a central-draft lamp, the combination, with the fount and the draft-tube thereof, the top of the former being constructed with a cam-surface, of a wick-carrier comprising two bowed clamping-arms, each having a straight shank and made of a single piece of spring sheet metal, a draw-bar attached to the outer ends of the said shanks, a dog pivoted between the shanks and having a wedge and a tripping-tooth located above the same, the said tooth engaging with the said cam-surface to turn the dog in one direction, and a tripping device depending from the top of the fount and constructed to permit the dog to be forced inward for entering its wedge between the arms when the carrier is raised to the top of the fount and operating through the tripping-tooth to withdraw the wedge from between the arms when the draw-bar is pressed downward, substantially as described.

3. In a central-draft lamp, the combination, with the fount and draft-tube thereof, the top of the former being constructed with a cam-surface, of a wick-carrier comprising two bowed clamping-arms, each having a straight shank, a draw-bar attached to the outer ends of said shanks, a dog pivoted between the shanks between the said draw-bar and the arms and constructed with a wedge, and a tooth located above the same, the said tooth engaging with the said cam-surface to turn the dog in one direction, and a tripping device consisting of a plate depending vertically from the top of the fount and formed with an opening to receive the tooth and thus permit the dog to be turned inward on its pivot when the carrier is raised and operating through the tripping-tooth to withdraw the wedge from between the arms when the draw-bar is forced downward, substantially as described.

In testimony whereof I have signed this specification in the presence of two subscribing witnesses.

JOHN C. MILLER.

Witnesses:
F. L. CURTISS,
GEO. G. BLAKESLEE.